US011068960B2

(12) United States Patent
Xu et al.

(10) Patent No.: US 11,068,960 B2
(45) Date of Patent: Jul. 20, 2021

(54) METHODS AND APPARATUS FOR ITEM SUBSTITUTION (71) Applicant: Walmart Apollo, LLC, Bentonville, AR (US)

(72) Inventors: Da Xu, San Jose, CA (US); Chuanwei Ruan, Sunnyvale, CA (US); Kamiya Motwani, Sunnyvale, CA (US); Evren Korpeoglu, San Jose, CA (US); Sushant Kumar, Sunnyvale, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 126 days.

(21) Appl. No.: 16/424,799

(22) Filed: May 29, 2019

(65) Prior Publication Data
US 2020/0380578 A1  Dec. 3, 2020

(51) Int. Cl.
G06Q 30/00    (2012.01)
G06Q 30/06    (2012.01)
G06N 20/00    (2019.01)

(52) U.S. Cl.
CPC ......... *G06Q 30/0631* (2013.01); *G06N 20/00* (2019.01); *G06Q 30/0629* (2013.01)

(58) Field of Classification Search
None
See application file for complete search history.

(56) References Cited

U.S. PATENT DOCUMENTS

| | | | |
|---|---|---|---|
| 10,685,308 B1* | 6/2020 | Avery, Jr. | G06Q 10/06315 |
| 2005/0149414 A1* | 7/2005 | Schrodt | G06Q 10/087 705/29 |
| 2010/0299360 A1* | 11/2010 | Yi | G06Q 30/0629 707/776 |

* cited by examiner

Primary Examiner — Mila Airapetian
(74) Attorney, Agent, or Firm — Duane Morris LLP; Manita Rawat (57) ABSTRACT This application relates to apparatus and methods for automatically identifying substitute items. A computing device can generate matrix data that identifies connection values between a plurality of items. The matrix data may be generated based on the application of one or more machine learning algorithms to historical data identifying accepted or denied item substitutions. The computing device may then receive item data identifying at least one second item and at least one attribute of that second item. The computing device may generate a graph based on the matrix data and the item data to determine connection values between the second item and the plurality of first items. The computing device may then determine a substitute item (e.g., a replacement item) for the second item based on the connection values between the second item and the plurality of first items.

20 Claims, 7 Drawing Sheets

METHODS AND APPARATUS FOR ITEM SUBSTITUTION

TECHNICAL FIELD

The disclosure relates generally to computerized retail management systems and, more specifically, to employing machine learning methods in retail management systems.

BACKGROUND

Retailers offer products for sale, which may be purchased by customers either in-store or online. In some cases, a retailer may be out of stock of a purchased item. For example, a customer may purchase an item online from a retailer's website, but the purchased item is out of stock. The customer may have selected an option to have the purchased item delivered, or an option to pick up the item at a retail location. The retailer may have to reimburse the customer for the cost of the purchased item if it cannot be delivered to, or be picked up by, the customer by a particular date. In other cases, a customer may inquire with a retailer about an out of stock item that the retailer usually carries. For example, a customer visiting a retail location may ask a retail associate about an out of stock item. Because the item is out of stock, the customer may engage a retail associate to discuss the out of stock item and may ask for a recommended substitute item. In each of these cases, the retailer may suffer time and/or financial losses.

At least some retailers may offer a substitute item to the customer. For example, a retail associate, such as a picker putting together purchased items for an order for delivery or pickup, may determine that an item is out of stock. The picker may attempt to substitute the item with a similar item. Retail associates, however, may use their own personal judgement in deciding what the substitute item should be. The customer, however, may not be satisfied with the substituted item. The customer may reject the substituted item, causing further financial and time losses to the retailer. As such, a retailer may benefit from identifying suitable substitute items when, for example, items are out of stock.

SUMMARY

The embodiments described herein are directed to automatically identifying substitute items. The embodiments may allow a retailer to more reliably identify a substitute item for an out of stock item. For example, the embodiments may allow a retail associate to identify a substitute item that has a higher probability of being acceptable to a customer. For example, the embodiments may increase probabilities that a customer will be satisfied with the substitute item for an otherwise out of stock, or undeliverable, item. As a result, the embodiments may allow a retailer to decrease or minimize financial and time losses when an item is out of stock.

In accordance with various embodiments, exemplary systems may be implemented in any suitable hardware or hardware and software, such as in any suitable computing device. For example, in some embodiments, a computing device is configured to generate matrix data that identifies connection values between a plurality of items. The matrix data may be generated based on the application of one or more machine learning algorithms to historical data identifying accepted or denied item substitutions. The computing device may receive item data identifying at least one second item and at least one attribute of that second item. The computing device may generate a graph based on the matrix data and the item data to determine connection values between the second item and the plurality of first items. In some examples, the computing device may generate the graph by executing a generative graph convolution network algorithm. The computing device may then determine a substitute item (e.g., a replacement item) for the second item based on the connection values between the second item and the plurality of first items.

In some embodiments, a method is provided that includes generating matrix data that identifies connection values between a plurality of items. The matrix data may be generated based on the application of one or more machine learning algorithms to historical data identifying accepted or denied item substitutions. The method may also include receiving item data identifying at least one second item and at least one attribute of that second item. The method may further include generating a graph based on the matrix data and the item data to determine connection values between the second item and the plurality of first items. The method may further include determining a substitute item for the second item based on the connection values between the second item and the plurality of first items.

In yet other embodiments, a non-transitory computer readable medium has instructions stored thereon, where the instructions, when executed by at least one processor, cause a computing device to perform operations that include generating matrix data that identifies connection values between a plurality of items. The matrix data may be generated based on the application of one or more machine learning algorithms to historical data identifying accepted or denied item substitutions. The operations may also include receiving item data identifying at least one second item and at least one attribute of that second item. The operations may further include generating a graph based on the matrix data and the item data to determine connection values between the second item and the plurality of first items. The operations may further include determining a substitute item for the second item based on the connection values between the second item and the plurality of first items.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
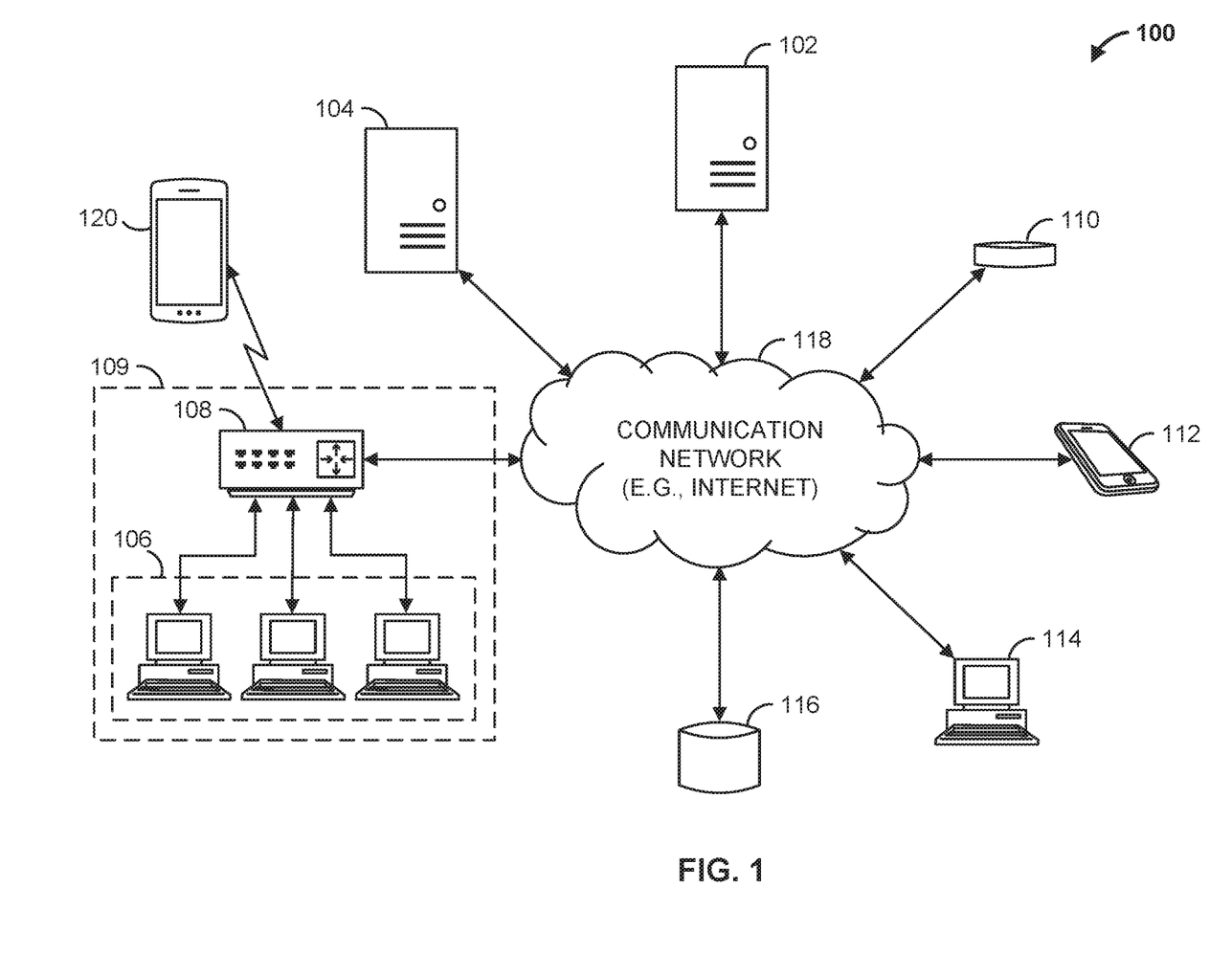
FIG. 1 is a block diagram of an item substitution system in accordance with some embodiments.

Turning to the drawings, FIG. 1 illustrates a block diagram of an item substitution system 100 that includes an item substitution computing device 102 (e.g., a server, such as an application server), a server 104 (e.g., a web server), workstation(s) 106, database 116, multiple customer computing devices 110, 112, 114, and associate computing device 120 communicatively coupled over network 118. Item substitution computing device 102, workstation(s) 106, server 104, multiple customer computing devices 110, 112, 114, and associate computing device 120 can each be any suitable computing device that includes any hardware or hardware and software combination for processing and handling information. For example, each of item substitution computing device 102, server 104, workstations 106, multiple customer computing devices 110, 112, 114, and associate computing device 120 can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

Item substitution computing device 102 can be, for example, a computer, a workstation, a laptop, a server such as a cloud-based server, or any other suitable device. Each of multiple customer computing devices 110, 112, 114 and associate computing device 120 can be a mobile device such as a cellular phone, a laptop, a computer, a table, a personal assistant device, a voice assistant device, a digital assistant, or any other suitable device.

Although FIG. 1 illustrates three customer computing devices 110, 112, 114, item substitution system 100 can include any number of customer computing devices 110, 112, 114. Similarly, item substitution system 100 can include any number of workstation(s) 106, item substitution computing devices 102, servers 104, associate computing devices 120, and databases 116.

Workstation(s) 106 are operably coupled to communication network 118 via router (or switch) 108. Workstation(s) 106 and/or router 108 may be located at a store 109, for example. Workstation(s) 106 can communicate with item substitution computing device 102 over communication network 118. The workstation(s) 106 may send data to, and receive data from, item substitution computing device 102. For example, workstation(s) 106 may transmit inventory data, such as data related to an out of stock item, to item substitution computing device 102. Workstation(s) may receive item substitution data, such as data identifying a substitute item for an out of stock item, from item substitution computing device 102.

In some examples, workstation(s) 106 are communicatively coupled with one or more associate computing devices 120. Each associate computing device 120 may be operated by a retail associate of store 109. In some examples, associate computing device 120 requests a list of substitute items for an out of stock item from workstation(s) 106. Workstation(s) 106 may respond with the requested list, which identifies at least one substitute item. Workstation(s) 106 may also communicate with server 104. For example, server 104 may be a web server and host one or more web pages, such as a retailer's website. Workstation(s) 106 may be operable to access and program (e.g., configure) the webpages hosted by server 104, for example.

Item substitution computing device 102 is operable to communicate with database 116 over communication network 118. For example, item substitution computing device 102 can store data to, and read data from, database 116. Database 116 can be a remote storage device, such as a cloud-based server, a memory device on another application server, a networked computer, or any other suitable remote storage. Although shown remote to item substitution computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and N$^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items. Web server 104 may store data related to the order such as an order number and the item identification numbers of the purchased item in database 116. In some examples, the web page allows a delivery option or pickup option of the order. For example, the delivery option provides for the delivery of the order at a specified delivery address by a particular date. The pickup option allows the customer to pick up the order at a retail location.

Item substitution computing device 102 may determine a substitute item for an out of stock item. The out of stock item may be one that was purchased online by a customer but not yet delivered to or picked up by the customer. For example, after a customer places an order on a retailer's webpage, web server 104 may transmit a message to a retail associate operating an associate computing device 120, where the message identifies the order including the items purchased. The retail associate may then proceed to gather the items purchased from store 109. If the retail associate cannot locate an item (e.g., the item is out of stock), the retail associate may cause associate computing device 120 may transmit a message to item substitution computing device 102 requesting one or more substitutions for the item. In response, item substitution computing device 102 may determine one or more substitute items for the out of stock item, and transmit a message to associate computing device 120 identifying the one or more substitute items (e.g., an item substitution list). The retail associate may then obtain the substituted item, rather than the originally ordered item, for the order.

In some examples, the retailer's webpage may have access to inventory amounts. When a customer selects an order for purchase, the web server 104 may determine whether each item is in stock. If an item is out of stock, web server 104 may request substitute items for the out of stock item from item substitution computing device 102. Item substitution computing device 102 may respond to the request with one or more substitute items in accordance with these disclosures, such as by transmitting a ranked item substitution list. In some examples, item substitution computing device 102 verifies whether the substitute items are in stock. If a substitute item is not in stock, the out of stock item is removed from the item substitution list. The retailer's web page may display the item substitution list such that the customer may select one or more of the items as a substitute for the original out of stock item.

To determine the one or more substituted items, item substitution computing device 102 may employ one or more machine learning algorithms, such as a neural network algorithm. In some examples, the machine learning algorithms are trained with previously accumulated historical item substitution data. For example, and as discussed further below, database 116 may store item substitution data identifying originally ordered items that are out of stock, as well as substitute items for the out of stock item that were either accepted, or rejected, by the customer. The training data may be based, for example, on data identifying whether a previously offered substitute item was accepted by the customer for an out of stock item. Item substitution computing device 102 may then employ the trained machine learning algorithms to determine probably substitutes for out of stock items.

In some examples, item substitution computing device 102 generates an attribute matrix that identifies one or more attribute vectors for each item. Each attribute vector may identify one or more attributes of the item. Attributes of an item may include, for example, a category, a brand, a flavor, a manufacture, a quality, a color, a dimension (e.g., height, length and width), a weight, or any other characteristic or data related to the item. For example, a first attribute vector for an ice cream item may identify the category of the item (in this example, ice cream), the brand of the ice cream, and the flavor of the ice cream (e.g., $X_1$=(category, first brand, flavor)). A second attribute vector may identify a different brand of ice cream, but have the same category (ice cream) and flavor (e.g., $X_2$=(category, second brand, flavor)).

Item substitution computing device 102 may also generate an adjacent matrix that identifies confidence or acceptance scores between an anchor item (e.g., an out of stock item) and a substitute item for the anchor item. The adjacent matrix may be generated based on applying one or more machine learning algorithms to historical data (e.g., historical item substitution data) and the adjacent matrix. In some examples, the machine learning algorithms may determine one or more weights that are to be applied to one or more attributes, signifying that those attributes are more relevant when determining item substitutions.

Based on the adjacent matrix and the attributes matrix, item substitution computing device 102 generates a graph identifying confidence scores between attribute vectors (which may be represented as nodes). The generated graph may show, continuing the ice cream example from above, for example, a connection between the first attribute vector and the second attribute vector with an acceptance or confidence score as identified by the adjacent matrix.

Figure 7:
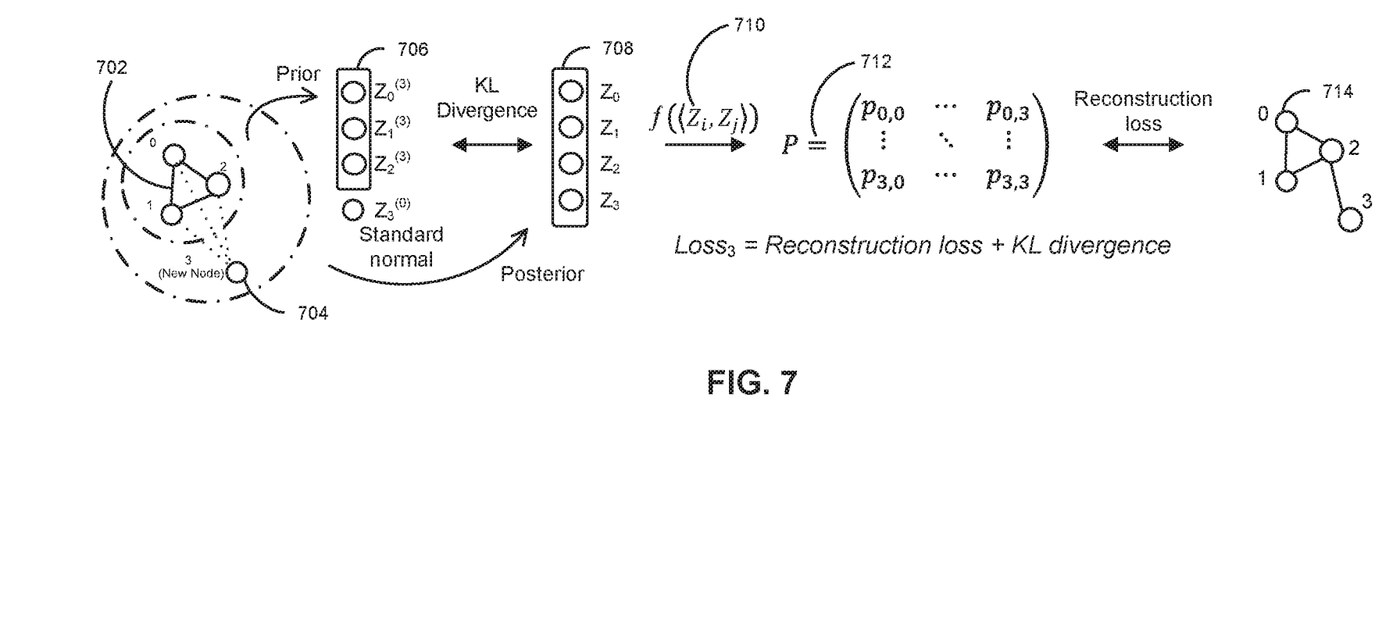
FIG. 7 illustrates a generative graph convolution network model that may be employed by the item substitution computing device of FIG. 1.

In some examples, item substitution computing device 102 employs a generative graph convolutional network algorithm, such as one based on a Bayesian latent factor model) to determine the substitute item. The generative graph convolutional network algorithm may include an encoder, a decoder, and a loss function. In this example, and with reference to FIG. 7, item substitution computing device 102 obtains an input graph 702 identifying three connected nodes, and an unconnected (e.g., new) node 704. Item substitution computing device 102 may apply the encoder to generate latent variables 706 based on prior probabilities between the three nodes identified by input graph 702. For example, for latent factors z with prior $p^0$, the encoder may execute an algorithm based on equation 1 below to generate probabilities:

$$P(Y,X) = \int p_\theta(Y,X|Z) p^0(z) dz; \quad \text{(eq. 1)}$$

where:
p=Joint distribution of observed data;
Y=Observed adjacent matrix;
X=Item attributes matrix;
Z=Latent variables;
z=any value of the latent variable Z;
$p_\theta$=Decoding ditribution from latent variables to observed data;
$p^0$=Prior distribution for the latent variables Z;

Item substitution computing device 102 also applies the encoder to generate latent variables 708 based on posterior probabilities, which may result in divergence, such as Kullback-Leibler (KL) divergence. For example, for new nodes (e.g., cold-start items), the encoder may execute an algorithm based on equation 2 below, which is computationally intractable:

$$p(z^{new}|Y^{new},X^{new}); \quad \text{(eq. 2)}$$

To account for divergence and reconstruction loss (e.g., by approximating with the variation distribution $q_\varphi(z|Y,X)$), item substitution computing device 102 may apply a loss function to optimize the evidence lower bound (ELBO). For example, item substitution computing device 102 may apply a loss function in accordance with equation 3 below:

$$\log p(Y, X) = \log \int p_\theta(Y, X | Z) = \frac{p^0(z)}{q_\varphi(z | Y, X)} q_\varphi(z | Y, X) dz \geq \quad \text{(eq. 3)}$$
$$-KL(q_\varphi(z | Y, X) \| p^0(z)) + E_{q_\varphi(z|Y,X)}(p_\theta(Y, X | Z))$$

where:
KL=Kullback Leibler divergence;

$q_\varphi$=Encoding distribution;
$E_{q_\varphi(z|Y,X)}$=Expectation of latent variables Z under encoding distribution;
$p_\theta(Y,X|Z)$=Decoding distribution;

By maximizing ELBO, the KL divergence term, which specifies the dissimilarity between prior and posterior distribution for the latent factors z, is reduced. Also, the $E_{q_\varphi(z|Y,X)}(p_\theta(Y,X|z))$ term, which gives the probability of observed data under the particular encoding and decoding distributions specified by the parameters φ and θ, is enlarged. Combined together, observed data is reconstructed while respecting the specified prior distribution on the latent factors.

Item substitution computing device 102 may then apply the decoder of the generative graph convolutional network algorithm 710 to generate probabilities 712, which identifies probabilities between the input graph 702 and the new node 704. Item substitution computing device 102 then generates an output graph 714 based on the input graph and the generated probabilities 712. The output graph may incur reconstruction loss.

As a result, output graph 714 represents a growth of input graph 702 as it identifies the originally three connected nodes of input graph 702 as well as new node 704. This solution offers a sound evidence lower bound approach for adaptively learning from sequential processes. In addition, the solution solves "cold-start" problems (e.g., not having previous associations for new nodes, e.g., new node 704) by using both node attributes and graph topological information for inferring representations of isolated new nodes.

The following example illustrates an example of a generative graph convolution network for growing graphs. Let $A_t^\pi \in \mathbb{R}^{t \times t}$ be the observed adjacency matrix up to the $t^{th}$ step according to the ordering π. When the $(t+1)^{th}$ node is presented, item substitution computing device 102 treats it as connected to all the previous nodes with the same probability $\tilde{p}$, where $\tilde{p}$ may reflect the overall sparsity of the graph. In other words, each new node is determined to be connected to all previous nodes with the same probability $\tilde{p}$. Hence the new candidate adjacency matrix denoted by $\tilde{A}_{t+1}^\pi$ is defined by the equation below:

$$(\tilde{A}_{t+1}^\pi)_{t+1,t+1}=1, (\tilde{A}_{t+1}^\pi)_{1:t,1:t}=A_t^\pi, p((\tilde{A}_{t+1}^\pi)_{k,t+1}=1)=\tilde{p}$$
$$\text{for } k=1,2,\ldots,t \quad \text{(eq. 4)}$$

The marginal distribution for graph may be obtained by sampling the auxiliary π from the joint distribution of $p(\mathcal{G},(A^\pi,X^\pi))$ with the following equation:

$$p(\mathcal{G})=\Sigma_\pi p((A^\pi,X^\pi)\mathbb{1}_{[f_G(A^\pi,X^\pi)=\mathcal{G}]}) \quad \text{(eq. 5)}$$

$f_G(A^\pi,X^\pi)$ maps the tuple $(A^\pi,X^\pi)$ back to a unique graph G. Each sampled π gives a $(A^\pi,X^\pi)$ that constitutes one-sample mini-batch that drives the stochastic gradient descent (SGD) for updating parameters.

To illustrate the sequential generation process, the joint marginal log-likelihood of $(A_{\leq n}, X_{\leq n})$ is decomposed under the node ordering π by executing the following equation:

$$\log p(A_{\leq n}^\pi, X_{\leq n}^\pi)=\Sigma_{i=1}^{n-1} \log p(A_{\leq i+1}^\pi, X_{\leq i+1}^\pi | A_{\leq i}^\pi, X_{\leq i}^\pi)+\log p(A_1^\pi, X_1^\pi) \quad \text{(eq. 6)}$$

In this example, the log-likelihood term of initial state $\log p(A_1^\pi, X_1^\pi)$ is ignored (not of interest) when focusing on modeling transition steps.

For each transition step, the encoding distribution of $q_\varnothing^i(\mathcal{Z}|A_{\leq i},X_{\leq i})$ is utilized, generating distribution $p_\theta^i(A|z^i)$ and conditional prior $p_0^i(\mathcal{Z}|A_{\leq i},X_{\leq i})$. The conditional on π will be treated as implicit for simplicity of notation below. The variational lower bound for each step is defined by the following equation:

$$\log p(A_{\leq i+1}, X_{\leq i+1} | A_{\leq i}, X_{\leq i}) \geq \quad \text{(eq. 7)}$$
$$E_{q_\varnothing^i(z^{i+1}|\tilde{A}_{\leq i+1}, X_{\leq i+1})}[\log p_\theta^i(A_{\leq i}|z^i)-$$
$$KL(q_\varnothing^i(z^{i+1}|\tilde{A}_{\leq i+1}, X_{\leq i+1}) \| p_\theta^i(z^{i+1}|A_{\leq i}, X_{\leq i}))+$$
$$C \equiv ELBO_i + C$$

Here, C is the reconstruction term for node attributes. In some examples, $C=\log \int \mathcal{Z} p_\theta^i(X_{\leq i}|\mathcal{Z}^i q_\varnothing^i(\mathcal{Z}^{i+1}|\mathcal{Z}^{i+1})dv(\mathcal{Z}))$. Given that the consistency of underlying generating mechanism is assumed, the same set of parameters are utilized for each step.

When formulating the encoding distribution, graph convolutional network convolutional layers are adopted. For example, a two-layer encoder for an $i^{th}$ step is defined by the following equation:

$$\mu(\mathcal{Z}^i|X_{\leq i+1})=\hat{A}_{\leq i+1}\sigma(\hat{A}_{\leq i+1}X_{\leq i+1}W_0)W_1, \text{diag}(\Sigma($$
$$\mathcal{Z}^i|X_{\leq i+1})=\hat{A}_{\leq i+1}\sigma(\hat{A}_{\leq i+1}X_{\leq i+1}W_0)W_2 \quad \text{(eq. 8)}$$

Here, α(•) is an activation function and $\hat{A}$ denotes the normalized candidate adjacency matrix constructed by equation 4 above. In addition, a pairwise inner product decoder for edge generation is adopted, such as the one defined by the equation below:

$$p_{i,j}=p(A_{i,j}=1|\mathcal{Z}_i, \mathcal{Z}_j=f(\langle \mathcal{Z}_i, \mathcal{Z}_j \rangle) \quad \text{(eq. 9)}$$

Here, f(•) represents a sigmoid function. Additionally, because there is information from previous i nodes at each $(i+1)^{th}$ step, $\mathcal{Z}^{i+1} \in \mathbb{R}^{(i+1) \times d_2}$ may be treated as $[\mathcal{Z}_{1:i}^{i+1}, \mathcal{Z}_{i+1}^{i+1}]$, where $\mathcal{Z}_{1:i}^{i+1}$ are the hidden factors for previous nodes and $\mathcal{Z}_{i+1}^{i+1}$ is for the new node. For $\mathcal{Z}_{1:i}^{i+1}$, the encoding distribution of $p_\varnothing(\mathcal{Z}_{1:i}|\tilde{A}_{\leq i+1}, X_{\leq i+1})$ may be used where the candidate adjacency matrix $\tilde{A}_{\leq i+1}$ passes information from previous steps. In addition, when standard Gaussian prior is used for the new node, the following equation results:

$$p_0^i(\mathcal{Z}_{1:i}^{i+1}|A_{\leq i},X_{\leq i})=p_\varnothing(\mathcal{Z}_{1:i}|\tilde{A}_{\leq i+1}, X_{\leq i+1}) \mathcal{Z}_{i+1}^{i+1}|A_{\leq i}, X_{\leq i} \sim N(0,I) \quad \text{(eq. 10)}$$

Here, $N(0,I)$ is the multivariate standard normal distribution with the all-zero vector as mean vector and identity matrix as covariance matrix. In some examples, the sum of negative ELBO is used in each transition step as a loss function defined by the equation below:

$$L=-\Sigma_{i=1}^{n-1}ELBO_i \quad \text{(eq. 11)}$$

The joint log marginal probability distribution of equation 6 above (i.e., $\log p(A_{\leq n}^\pi, X_{\leq n}^\pi)$) may be determined by the total loss L in equation 11 above Aggregation weights $[W_0, W_1, W_2]$ may be obtained by minimizing the loss defined by equation 11 above. The weights may be randomly initialized and updated using a stochastic gradient decent algorithm during training, for example. At each step, equation 8 above may use the weights to generate latent variables from the variation encoding distribution.

In some examples, the loss function incorporates a reconstruction loss and an adaptive regularizer that enforces the posterior of latent factors for observed nodes to remain close to their priors, which contain information from previous steps. These features can prevent the overfitting of edges of new nodes into an original input graph. For example, the loss function may be defined by the equation below, where the first term represents the reconstruction loss in each generation step, and the second term serves as the adaptive regularizer:

$$-\sum_{i=1}^{n-1} E_{q_\phi^i(z^{i+1}|\tilde{A}_{\le i+1}, X_{\le i+1})}[\log p_\theta(A_{\le i} | z^i)] + \quad \text{(eq. 12)}$$

$$\beta \sum_{i=1}^{n-1} KL(q_\phi^i(z^{i+1} | \tilde{A}_{\le i+1}, X_{\le i+1}) \| p_\theta^i(z^{i+1} | A_{\le i}, X_{\le i}))$$

The parameter $\beta$ in the above equation acts as a tuning parameter to control a tradeoff between the reconstruction term and the adaptive regularization term.

In some examples, incoming new nodes 704 are added one by one onto the output graph 714 in the matter described above. In other examples, incoming new nodes 704 may be added onto the output graph 714 in a batch wise fashion. For example, item substitution computing device 102 may employ a parallel data processing technique (e.g., via multiple cores operating in a parallel fashion, or with parallel circuitry) to add multiple nodes to an output graph. In some examples, output graphs represent item substitutions for one or more items. For example, an output graph may be generated for each individual item, where connected nodes represent item substitutions for the individual item. Each connection may be associated with a probability (e.g., as discussed above). A first connected node with a higher probability than a second connected node indicates that the item associated with the first node is a better substitute than the item associated with the second node for the individual item.

In some examples, one output graph is generated identifying all nodes, where each node represents an individual item, and where a connection from one node to another node indicates that the item associated with the second node may be substituted for the item associated with the first node with a corresponding probability. Note that a connection from one node to another does not necessarily mean or indicate that the items are substitutes for each other at the same probability. Instead, a first node may be connected to a second node with a first probability (e.g., arrow from first node to the second node, so second node may be substituted for the first node at the first probability), while the second node may be connected to the first node with a second probability (e.g., arrow from second node to the first node, so first node may be substituted for the second node at the second probability). The item substitutions may be represented in an item substitution matrix which indicates possible substitutions for each item. In some examples, the item substitution matrix includes ranked item substitutions for each item, where the ranking is based on the associated probabilities. For example, substitute items with higher associated probabilities are ranked ahead of substitute items with lower associated probabilities.

Figure 2:
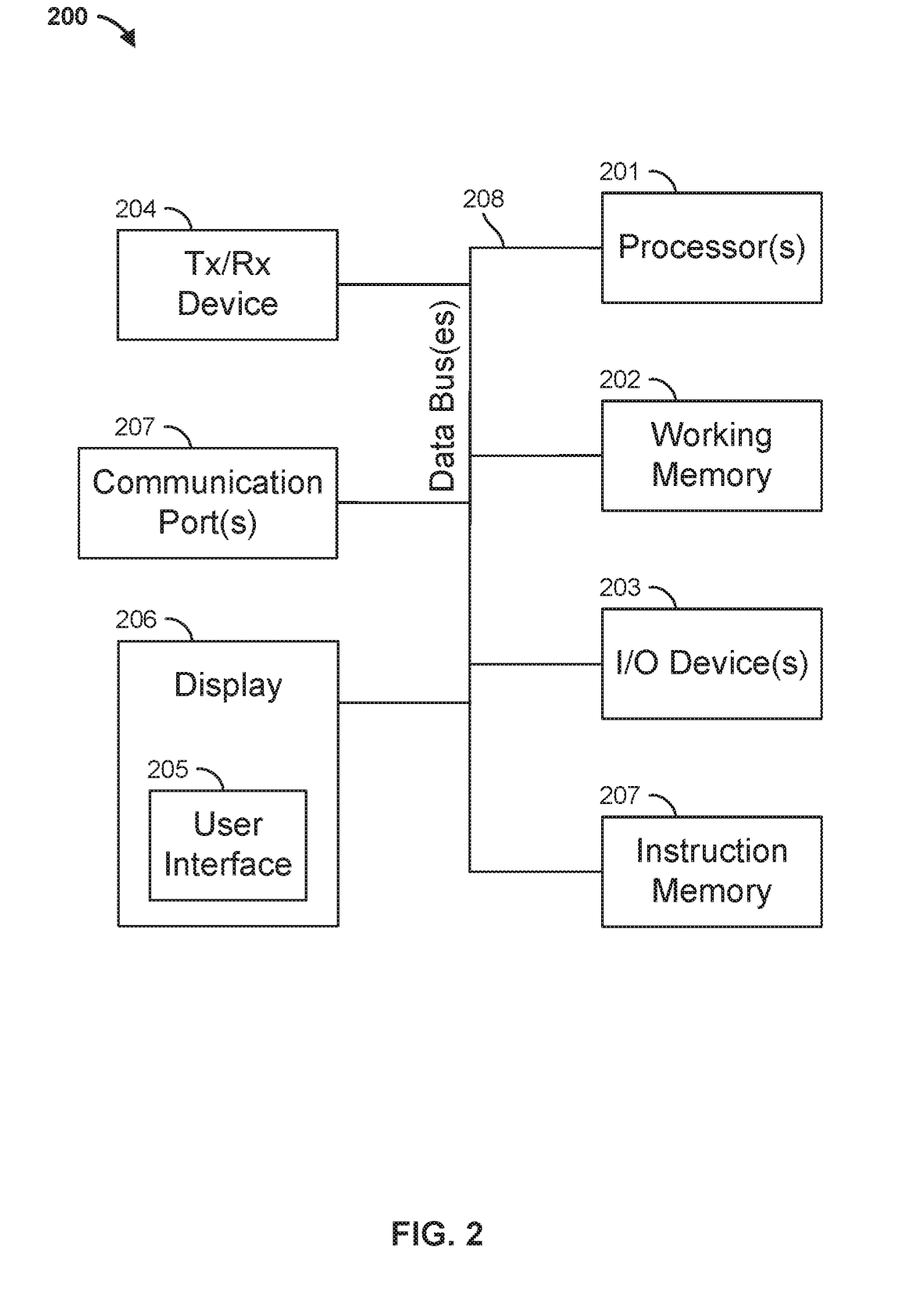
FIG. 2 is a block diagram of the item substitution computing device of the item substitution system of FIG. 1 in accordance with some embodiments.

FIG. 2 illustrates an example of the item substitution computing device 102 of FIG. 1. Item substitution computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item substitution computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as item substitution data.

Display 206 can display user interface 205. User interfaces 205 can enable user interaction with item substitution computing device 102. For example, user interface 205 can be a user interface for an application of a retailer that allows a customer to initiate the return of an item to the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item substitution computing device 102 will be operating in. Processor(s) 201 is operable to receive data from, or send data to, a network, such as communication network 118 of FIG. 1, via transceiver 204.

Figure 3:
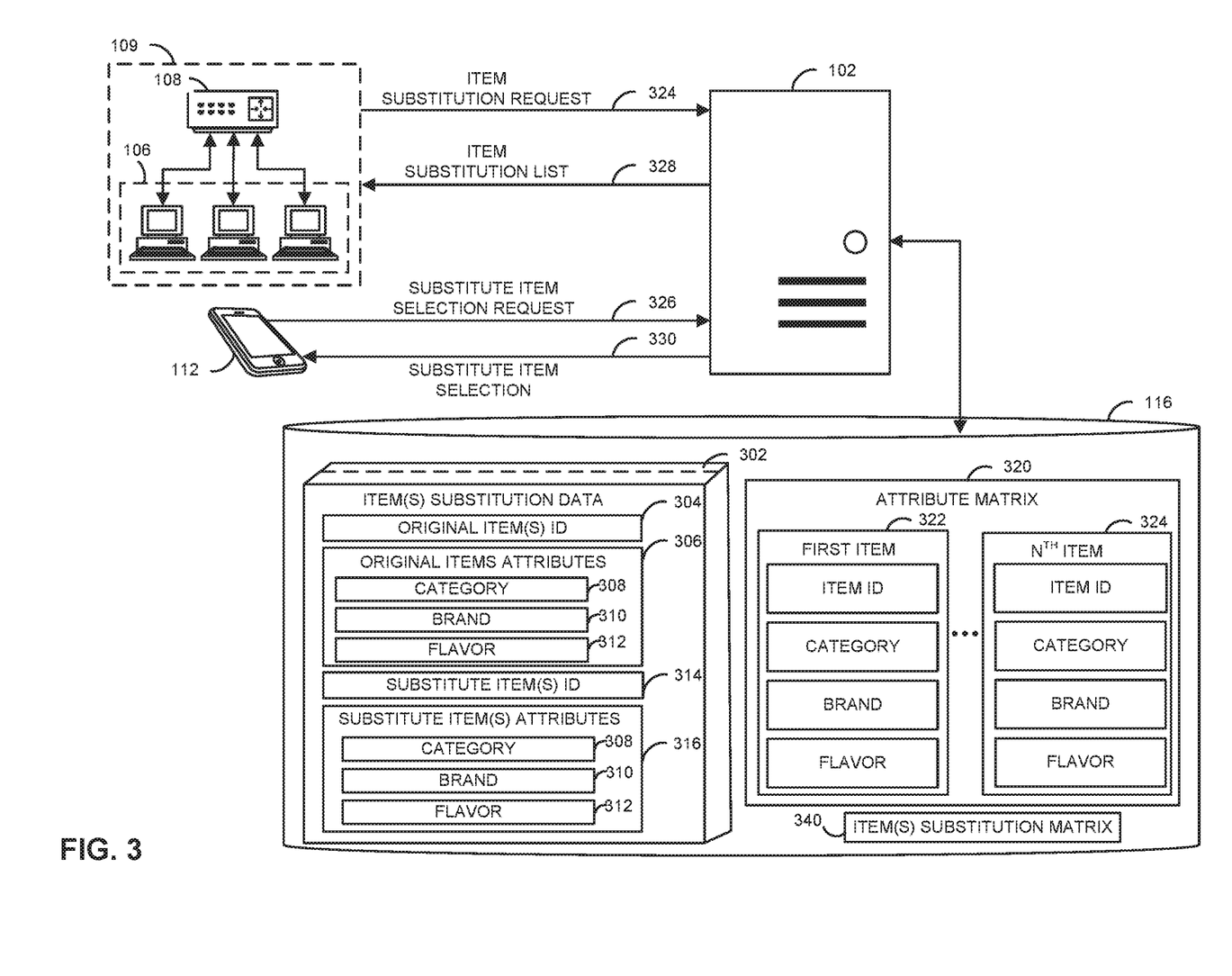
FIG. 3 is a block diagram illustrating examples of various portions of the item substitution system of FIG. 1 in accordance with some embodiments.

FIG. 3 is a block diagram illustrating examples of various portions of the item substitution system 100 of FIG. 1. In this example, database 116 stores item substitution data 302, which identifies successful and unsuccessful item substitutions. For example, item substitution data 302 may be based on historical data identifying when customers accept, or reject, an item substitution. In this example, item substitution data 302 includes original item identifications (IDs) 304, which identify one or more items from a previous order that were out of stock (or otherwise unavailable, e.g., unavailable for pickup or delivery for any reason). Item substitution data 302 also includes original item attributes 306, which identify one or more attributes of each item identified by original item IDs 304. In this example, original item attributes 306 include a category 308 of each item, a brand 310 of each item, and a flavor (or version) 312 of each item. Item substitution data 302 also includes substitute item IDs 306, which identify one or more items from a previous order that were attempted to be substituted for another item. Substitute item IDs 306 may also identify whether the substitution was successful or not. Item substitution data 302 further includes substitute item attributes 316, which identify one or more attributes of each item identified by substitute item IDs 306.

Based on item substitution data 302, item substitution computing device 102 may train one or more machine learning algorithms. The machine learning algorithms may determine acceptance or confidence scores (e.g., probabilities) between an anchor item and a substitute item for the anchor item. In some examples, item substitution computing device 102 generates an adjacent matrix that identifies the acceptance or confidence scores between each anchor item and corresponding substitute item. In some examples, item substitution computing device 102 executes the trained machine learning algorithms to determine probable substitutes for out of stock items. For example, upon receiving a request for an item substitution for a particular item, item substitution computing device 102 may execute one or more of the machine learning algorithms to determine item substitutes for the particular item.

In some examples, item substitution computing device 102 generates attribute matrix 320 based on item substitution data 302. Attribute matrix 320 may identify, for each item, an attribute vector. In this example, attribute matrix identifies a first item 322, up to an $N^{th}$ item 324, each item associated with attributes including an item ID, category, brand, and a flavor.

Figure 4A:
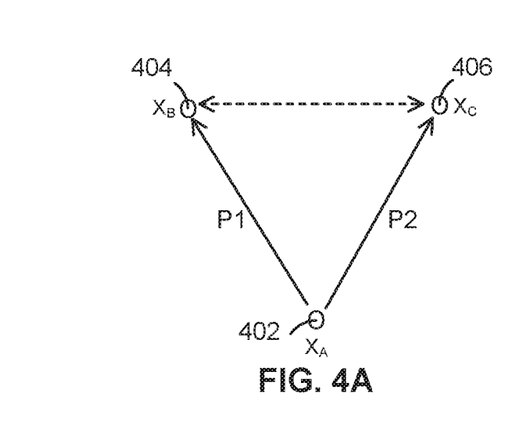
FIGS. 4A-4D illustrate graphs with connected nodes representing attribute matrices in accordance with some embodiments.

Based on the attribute matrix 320 and an adjacent matrix, item substitution computing device 102 generates graphs with connected nodes, where each node represents an attribute matrix. For example, FIGS. 4A through 4D illustrate graphs with connected nodes. As illustrated in FIG. 4A, attribute matrix $X_A$ 402 is connected to attribute matrix $X_B$ 404 with a probability of $P_1$. Attribute matrix $X_A$ 402 is also connected to attribute matrix $X_C$ 406 with a probability of $P_2$. There is no connection, however, between attribute matrix $X_B$ 404 and $X_C$ 406. Similarly, in FIG. 4B, $X_A$ 402 is connected to attribute matrix $X_B$ 404 with a probability of $P_1$. Attribute matrix $X_B$ 404 is connected to attribute matrix $X_C$ 406 with a probability of $P_2$. There is no connection, however, between attribute matrix $X_A$ 402 and $X_C$ 406. The example of FIG. 4C is similar to the example of FIG. 4B, except that attribute matrix $X_C$ 406 is connected to attribute matrix $X_A$ 402 with a probability of $P_1$.

Figure 4B:
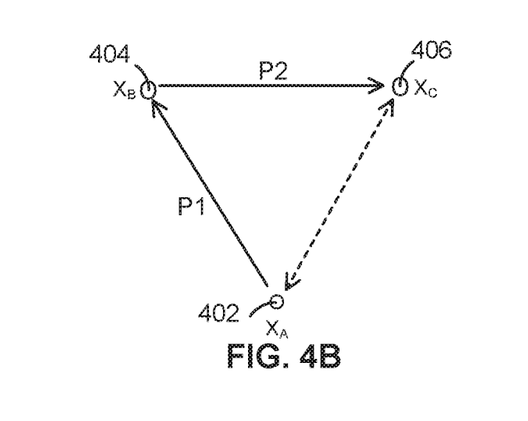
Figure 4C:
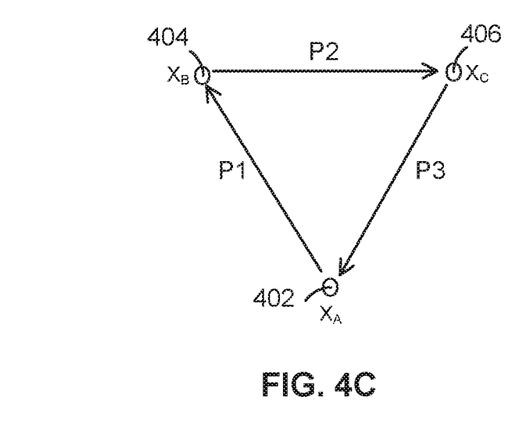
Figure 4D:
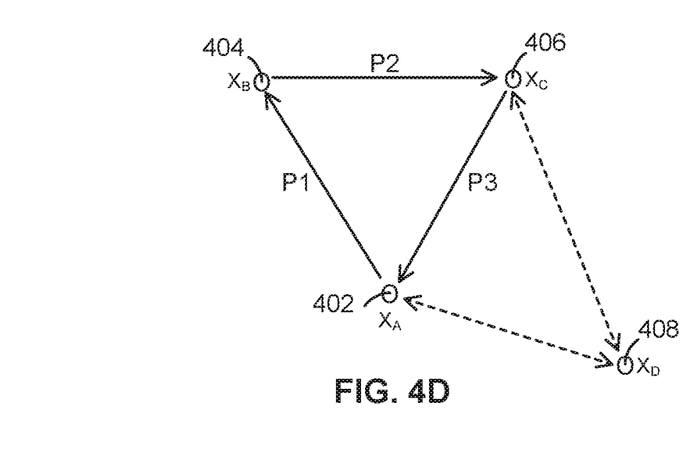

If a new node is received identifying a previously unconnected attribute matrix for an item (e.g., a "cold-start" item), item substitution computing device 102 may execute a generative graph convolution network to grow a graph, such as the graphs of FIGS. 4A, 4B, and 4C. For example, FIG. 4D illustrates the graph of FIG. 4C, alone with a new and unconnected attribute matrix $X_D$ 408. To determine connections to one or more of attribute matrices $X_A$ 402, $X_B$ 404, and $X_C$ 406, item substitution computing device 102 may execute one of the generative graph convolution networks discussed above.

Figure 5:
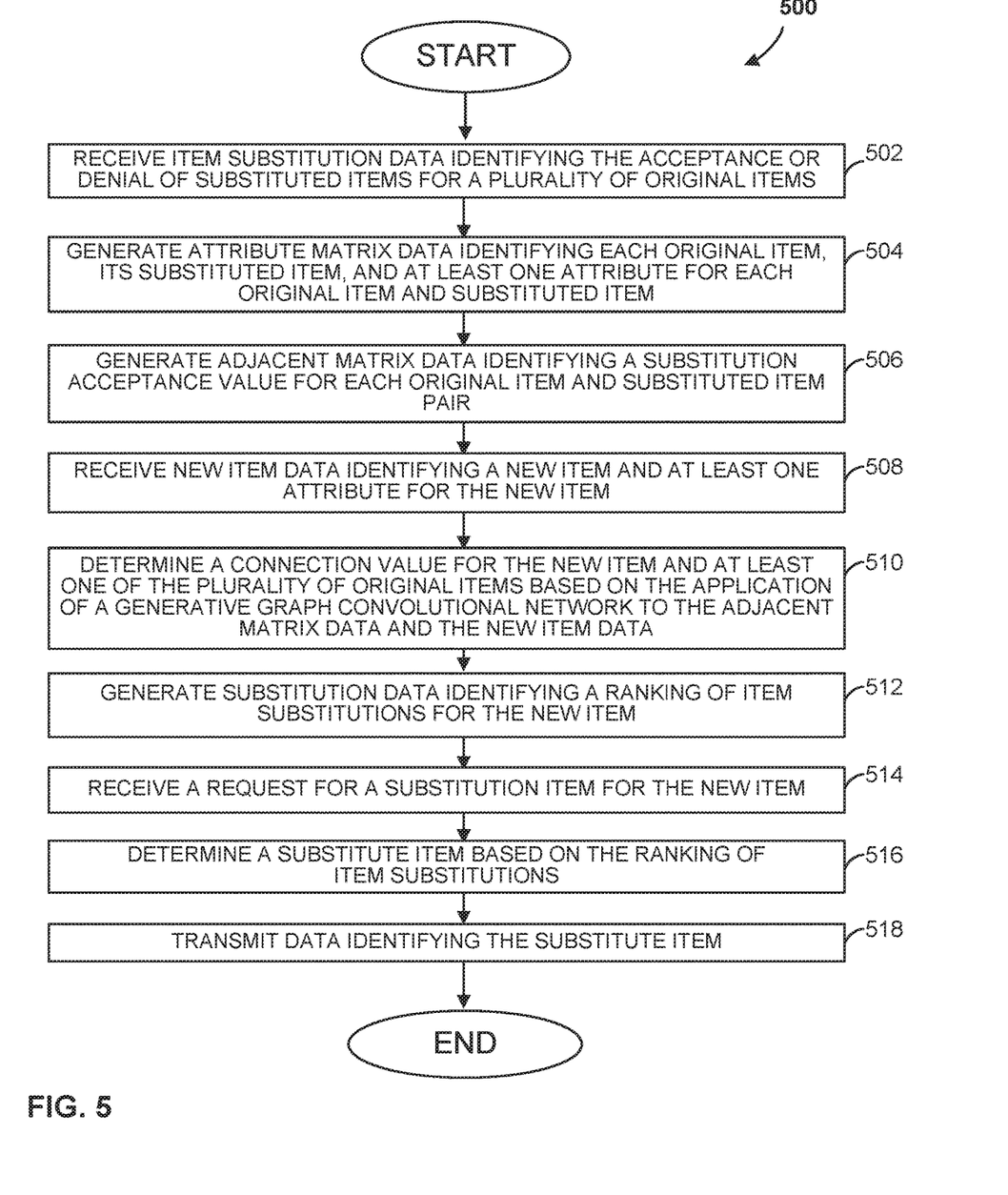
FIG. 5 is a flowchart of an example method that can be carried out by the item substitution system of FIG. 1 in accordance with some embodiments.

FIG. 5 is a flowchart of an example method 500 that can be carried out by the item substitution system 100 of FIG. 1. Beginning at step 502, a computing device, such as item substitution computing device 102, receives item substitution data identifying the acceptance, or denial, of substituted items for original items. For example, substitution computing device 102 may obtain item substitution data 302 from database 116. At step 504, attribute matrix data is generated for each original item identified by the item substitution data. The attribute matrix data identifies each original item, its substituted item, and at least one attribute for each original item and substituted item. Proceeding to step 506, adjacent matrix data is generated. The adjacent matrix data may be generated based on the execution of one or more machine learning algorithms operating on the attribute matrix data. The adjacent matrix data identifies a substitution acceptance value for each original item and substituted item pair. For example, each substitution acceptance value may be a probability value indicating a probability that the substituted item would be accepted by a customer when the original item is out of stock.

Proceeding to step 508, new item data is received. The new item data identifies a new item (e.g., an item not identified by the item substitution data received in step 502) and at least one attribute for the new item. At step 510, connection values (e.g., substitution values) for the new item and at least one of the plurality of original items is generated based on the application of a generative graph convolutional network to the adjacent matrix data and the new item data. For example, item substitution computing device 102 may employ the generative graph convolutional network algorithm described with reference to FIG. 7 to generate the connection values. Proceeding to step 512, substitution data is generated that identifies a ranking of item substitutions for the new item. The substitution data is based on the generated connection values. For example, a substitution item with a connection value that indicates a more close association with the new item is ranked higher than another substitution item with a different connection value indicating a less close association with the new item.

At step 514, a substitution request is received for the new item. For example, item substitution computing device 102 may receive a substitution request from associate computing device 120 requesting item substitutes for the new item. The substitution request may have been sent because the new item was purchased and is to be delivered or picked up as part of an order, but is out of stock, for example. At step 516, a substitute item is determined based on the ranking of item substitutions for the new item. For example, the substitute item may be the highest ranked substitute item identified by the generated substitution data. At step 518, data identifying the determined substitute item is transmitted. For example, item substitution computing device 102 may transmit data identifying the substitute item to associate computing device 120. An associate operating associate computing device 120 may then gather the substitute item for delivery or pickup with the order.

Figure 6:
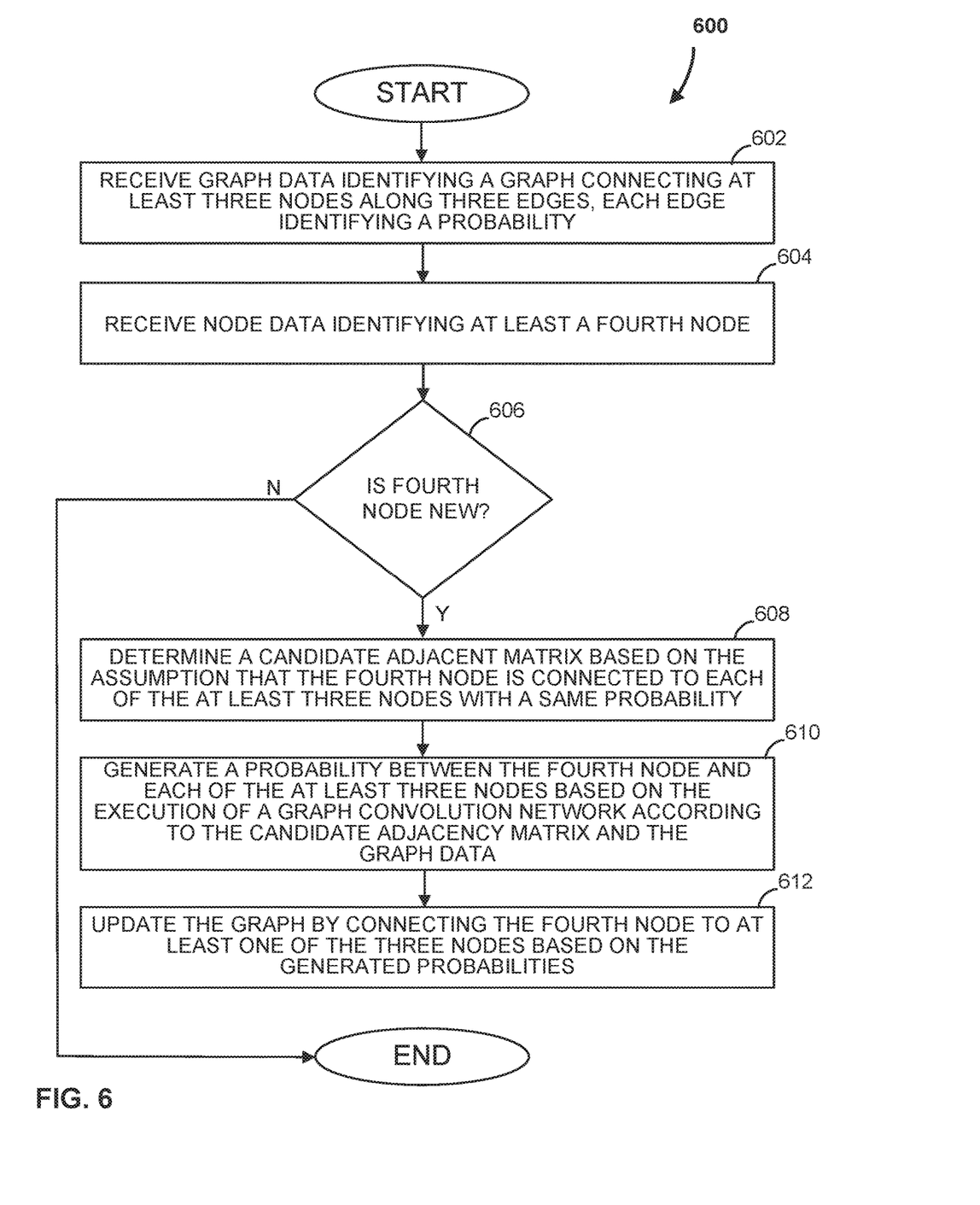
FIG. 6 is a flowchart of another example method that can be carried out by the item substitution system 100 of FIG. 1 in accordance with some embodiments.

FIG. 6 is a flowchart of another example method 600 that can be carried out by the item substitution system 100 of FIG. 1. At step 602, a computing device, such as item substitution computing device 102, receives graph data identifying a graph connecting at least three nodes along three edges, where each edge identifies a probability. For example, item substitution computing device 102 may receive input graph 702. At step 604, node data identifying at least a fourth node is received. For example, item substitution computing device 102 may receive unconnected node 704. Proceeding to step 606, a determination is made as to whether the fourth node is new. If the fourth node is not new, the method ends. For example, if the fourth node is already identified by the graph data, the fourth node is not new. If, however, the fourth node is new, the method proceeds to step 608.

At step 608, a candidate adjacent matrix is determined based on an assumption that the fourth node is connected to each of the at least three nodes with a same probability. The method then proceeds to step 610, where a probability is generated between the fourth node and each of the at least three nodes based on the execution of a graph convolution network according to the candidate adjacency matrix and the graph data. For example, item substitution computing device 102 may execute generative graph convolutional network algorithm 710 to generate probabilities 712. At step 612, the graph is updated by connecting the fourth node to at least one of the three nodes based on the generated probabilities. For example, item substitution computing device 102 may generate output graph 714, which connects new node 704 to input graph 702 based on probabilities 712. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
    a database; and
    a computing device communicatively coupled to the database and configured to:
        obtain, from the database, matrix data identifying connection values between a plurality of first items;
        receive item data identifying at least one second item and at least one attribute of the at least one second item;
        generate a graph based on the matrix data and the item data to determine at least one connection value between the at least one second item and at least one of the plurality of first items;
        store the graph in the database;
        determine at least one substitute item for the at least one second item based on the at least one connection value between the at least one second item and the at least one of the plurality of first items;
        transmit data identify the at least one substitute item in response to the received item data.

2. The system of claim 1, wherein generating the graph comprises treating the item data as connected to each of the plurality of first items with a same connection value.

3. The system of claim 1, wherein the computing device is configured to:
    generate a ranking list based on the determined connection values; and
    determine the at least one substitute item based on the generated ranking list.

4. The system of claim 1, wherein the computing device is configured to:
    receive item substitution data identifying the acceptance or denial of substituted items for the plurality of first items;
    generate attribute matrix data identifying at least one attribute for each of the substituted items and the plurality of first items; and
    generate the matrix data identifying the connection values between the plurality of first items based on the attribute matrix data.

5. The system of claim 4, wherein generating the matrix data comprise executing one or more machine learning algorithms to the item substitution data and the attribute matrix data to identify the connection values.

6. The system of claim 1, wherein the computing device is configured to:
    receive a request for a substitute item for the at least one second item; and
    transmit, in response to the request, the data identifying the at least one substitution item.

7. The system of claim 1, wherein generating the graph comprises:
    determining probabilities according to $p_0^i(\mathcal{Z}_{1:i}^{i+1}|A_{\leq i}, X_{\leq i}) = p_\varnothing(\mathcal{Z}_{1:i}|\tilde{A}_{\leq i+1}, X_{\leq i+1})$, wherein the at least one connection value is one of the determined probabilities.

8. The system of claim 7, wherein generating the graph comprises:
    determining a minimum loss based on a loss function according to $$-\sum_{i=1}^{n-1} E_{q_\phi^i(z^{i+1}|\tilde{A}_{\leq i+1}, X_{\leq i+1})}[\log p_\theta(A_{\leq i}|z^i)] +$$

$$\beta \sum_{i=1}^{n-1} KL\big(q_\phi^i(z^{i+1}|\tilde{A}_{\leq i+1}, X_{\leq i+1}) \| p_0^i(z^{i+1}|A_{\leq i}, X_{\leq i})\big);$$

determining at least one weight to apply based on the minimum loss; and applying the at least one weight.

9. A method comprising:

obtaining, from a database, matrix data identifying connection values between a plurality of first items;

receiving item data identifying at least one second item and at least one attribute of the at least one second item;

generating a graph based on the matrix data and the item data to determine at least one connection value between the at least one second item and at least one of the plurality of first items;

storing the graph in the database;

determining at least one substitute item for the at least one second item based on the at least one connection value between the at least one second item and the at least one of the plurality of first items; and transmitting data, identifying the at least one substitute item in response to the received item data.

10. The method of claim 9 wherein generating the graph comprises treating the item data as connected to each of the plurality of first items with a same connection value.

11. The method of claim 9 comprising:

generating a ranking list based on the determined connection values;

determining the at least one substitute item based on the generated ranking list.

12. The method of claim 9 comprising:

receiving item substitution data identifying the acceptance or denial of substituted items for the plurality of first items;

generating attribute matrix data identifying at least one attribute for each of the substituted items and the plurality of first items; and generating the matrix data identifying the connection values between the plurality of first items based on the attribute matrix data.

13. The method of claim 12 wherein generating the matrix data comprises executing one or more machine learning algorithms to the item substitution data and the attribute matrix data to identify the connection values.

14. The method of claim 9 comprising:

receiving a request for a substitute item for the at least one second item; and transmitting, in response to the request, the data identifying the at least one substitution item.

15. A non-transitory computer readable medium having instructions stored thereon, wherein the instructions, when executed by at least one processor, cause a device to perform operations comprising:

obtaining, from a database, matrix data identifying connection values between a plurality of first items;

receiving item data identifying at least one second item and at least one attribute of the at least one second item;

generating a graph based on the matrix data and the item data to determine at least one connection value between the at least one second item and at least one of the plurality of first items;

storing the graph in the database;

determining at least one substitute item for the at least one second item based on the at least one connection value between the at least one second item and the at least one of the plurality of first items; and transmitting data identifying the at least one substitute item in response to the received item data.

16. The non-transitory computer readable medium of claim 15 further comprising instructions stored thereon that, when executed by at least one processor, further cause the device to perform operations comprising:

generating the graph by treating the item data to be connected to each of the plurality of first items with a same connection value.

17. The non-transitory computer readable medium of claim 15 further comprising instructions stored thereon that, when executed by at least one processor, further cause the device to perform operations comprising:

generating a ranking list based on the determined connection values; and determining the at least one substitute item based on the generated ranking list.

18. The non-transitory computer readable medium of claim 15 further comprising instructions stored thereon that, when executed by at least one processor, further cause the device to perform operations comprising: receiving item substitution data identifying the acceptance or denial of substituted items for the plurality of first items; generating attribute matrix data identifying at least one attribute for each of the substituted items and the plurality of first items; and generating the matrix data identifying the connection values between the plurality of first items based on the attribute matrix data.

19. The non-transitory computer readable medium of claim 18 further comprising instructions stored thereon that, when executed by at least one processor, further cause the device to perform operations comprising executing one or more machine learning algorithms to the item substitution data and the attribute matrix data to identify the connection values.

20. The non-transitory computer readable medium of claim 19 further comprising instructions stored thereon that, when executed by at least one processor, further cause the device to perform operations comprising:

receiving a request for a substitute item for the at least one second item; and transmitting, in response to the request, the data identifying the at least one substitution item.

* * * * *